US012357028B2

(12) United States Patent
Lee et al.

(10) Patent No.: US 12,357,028 B2
(45) Date of Patent: Jul. 15, 2025

(54) HEATER ASSEMBLY AND METHOD OF MANUFACTURING THE SAME

(71) Applicant: KT&G CORPORATION, Daejeon (KR)

(72) Inventors: Seung Won Lee, Gyeonggi-do (KR); Yong Hwan Kim, Gyeonggi-do (KR); Sung Wook Yoon, Gyeonggi-do (KR); Dae Nam Han, Seoul (KR)

(73) Assignee: KT&G Corporation, Daejeon (KR)

( * ) Notice: Subject to any disclaimer, the term of this patent is extended or adjusted under 35 U.S.C. 154(b) by 423 days.

(21) Appl. No.: 17/908,326

(22) PCT Filed: Apr. 20, 2021

(86) PCT No.: PCT/KR2021/004958
§ 371 (c)(1),
(2) Date: Aug. 31, 2022

(87) PCT Pub. No.: WO2021/235711
PCT Pub. Date: Nov. 25, 2021

(65) Prior Publication Data

US 2023/0137819 A1 May 4, 2023

(30) Foreign Application Priority Data

May 20, 2020 (KR) ........................ 10-2020-0060529

(51) Int. Cl.
*A24F 13/00* (2006.01)
*A24F 40/20* (2020.01)
(Continued)

(52) U.S. Cl.
CPC ............ *A24F 40/465* (2020.01); *A24F 40/20* (2020.01); *A24F 40/70* (2020.01); *H05B 6/105* (2013.01); *H05B 6/36* (2013.01)

(58) Field of Classification Search
CPC ........................................................ A24F 47/00
(Continued)

(56) References Cited

U.S. PATENT DOCUMENTS 9,516,899 B2 12/2016 Plojoux et al.
9,717,277 B2 8/2017 Mironov
(Continued)

FOREIGN PATENT DOCUMENTS

CN 105307526 A 2/2016
CN 107920602 A 4/2018
(Continued)

OTHER PUBLICATIONS

Extended European Search Report dated Jun. 13, 2023 in Application No. 21809099.1.

(Continued)

*Primary Examiner* — Phuong K Dinh
(74) *Attorney, Agent, or Firm* — Foley & Lardner LLP

(57) ABSTRACT

A heater assembly for heating an aerosol generating material includes an accommodation portion configured to accommodate the aerosol generating material; an induction coil coupled to an outer surface of the accommodation portion; a susceptor located in the accommodation portion and configured to generate heat by an alternating magnetic field generated by a current flowing through the induction coil; and a support element coupled to the susceptor such that the susceptor is spaced apart from an inner surface of the accommodation portion by the support element, wherein the induction coil includes a wire including a conductor, an insulator surrounding the conductor, and a bonding member surrounding the insulator.

15 Claims, 9 Drawing Sheets

(51) Int. Cl.

| | |
|---|---|
| ***A24F 40/465*** | (2020.01) |
| ***A24F 40/70*** | (2020.01) |
| ***H05B 6/10*** | (2006.01) |
| ***H05B 6/36*** | (2006.01) |

(58) Field of Classification Search
USPC .................................................. 131/328–329
See application file for complete search history.

(56) References Cited

U.S. PATENT DOCUMENTS

| | | | | |
|---|---|---|---|---|
| 11,317,648 | B2 | 5/2022 | Mironov et al. | |
| 11,363,840 | B2 | 6/2022 | Courbat et al. | |
| 2017/0079326 | A1 | 3/2017 | Mironov | |
| 2018/0310622 | A1* | 11/2018 | Mironov | A24F 40/50 |
| 2019/0191767 | A1 | 6/2019 | Wu et al. | |
| 2019/0230987 | A1 | 8/2019 | Wu et al. | |
| 2020/0046028 | A1 | 2/2020 | Oh et al. | |
| 2020/0054069 | A1 | 2/2020 | Blandino et al. | |
| 2020/0060348 | A1 | 2/2020 | Mironov et al. | |
| 2022/0394824 | A1 | 12/2022 | Blandino et al. | |

FOREIGN PATENT DOCUMENTS

| | | | |
|---|---|---|---|
| CN | 207754554 | U | 8/2018 |
| CN | 207766584 | U | 8/2018 |
| EP | 3 469 936 | A2 | 4/2019 |
| JP | 2000-58251 | A | 2/2000 |
| JP | 2002-287540 | A | 10/2002 |
| JP | 2012-123910 | A | 6/2012 |
| JP | 2016-115400 | A | 6/2016 |
| JP | 2019-129820 | A | 8/2019 |
| KR | 10-2014-0116055 | A | 10/2014 |
| KR | 10-2015-0143885 | A | 12/2015 |
| KR | 10-2017-0008730 | A | 1/2017 |
| KR | 10-2018-0034640 | A | 4/2018 |
| KR | 10-2019-0141012 | A | 12/2019 |
| KR | 10-2020-0035027 | A | 4/2020 |

OTHER PUBLICATIONS

Japanese Office Action dated Aug. 29, 2023 in Application No. 2022-549354.

Korean Office Action of No. 10-2020-0060529 dated Dec. 7, 2021.

Korean Office Action of No. 10-2020-0060529 dated Jun. 14, 2022.

International Search Report of PCT/KR2021/004958 dated Aug. 4, 2021 [PCT/ISA/210].

Written Opinion of PCT/KR2021/004958 dated Aug. 4, 2021 [PCT/ISA/237].

First Office Action issued in Chinese Application No. 202180014576.1 dated Jun. 28, 2024 (14 Pages).

* cited by examiner

HEATER ASSEMBLY AND METHOD OF MANUFACTURING THE SAME

CROSS REFERENCE TO RELATED APPLICATIONS

This application is a National Stage of International Application No. PCT/KR2021/004958 filed on Apr. 20, 2021, claiming priority based on Korean Patent Application No. 10-2020-0060529 filed on May 20, 2020.

TECHNICAL FIELD

The present disclosure relates to a heater assembly of an aerosol generating device and a method of manufacturing the heater assembly.

BACKGROUND ART

Recently, the demand for alternative methods to overcome the shortcomings of general cigarettes has increased. For example, there is growing demand for a method of generating an aerosol by heating an aerosol generating material in cigarettes at a relatively low temperature, rather than by combusting cigarettes.

In addition, a research into a heater assembly of a heating-type aerosol generating device is being actively conducted. Examples of a heater assembly for heating an aerosol generating material include a resistance heating-type heater assembly and an induction heating-type heater assembly. Recently, the demand for the induction heating-type heater assembly which is capable of performing heating at a relatively low temperature is increasing.

DISCLOSURE OF INVENTION

Technical Problem

There is need for a heater assembly which is excellent in electrical efficiency, manufacturability, and/or productivity.

The problems to be solved by embodiments are not limited to the above-described problems, and undescribed problems may be clearly understood by those skilled in the art related to the present disclosure from the present specification and the accompanying drawings.

Solution to Problem

According to a first aspect of the present disclosure, a heater assembly for heating an aerosol generating material may include an accommodation portion configured to accommodate the aerosol generating material; an induction coil coupled to an outer surface of the accommodation portion; a susceptor located in the accommodation portion and configured to generate heat by an alternating magnetic field generated by a current flowing through the induction coil; and a support element coupled to the susceptor such that the susceptor is spaced apart from an inner surface of the accommodation portion by the support element, wherein the induction coil includes a wire including a conductor, an insulator surrounding the conductor, and a bonding member surrounding the insulator.

According to a second aspect of the present disclosure, a heater assembly for heating an aerosol generating material may include an accommodation portion configured to accommodate the aerosol generating material; an induction coil coupled to an outer surface of the accommodation portion; a susceptor located in the accommodation portion and configured to generate heat by an alternating magnetic field generated by a current flowing through the induction coil; and a support element arranged between the susceptor and the accommodation portion such that the susceptor is separated from an inner surface of the accommodation portion by a predetermined distance, wherein the induction coil includes a wire including a conductor and an insulator surrounding the conductor, and the induction coil is wrapped by a bonding element.

According to a third aspect of the present disclosure, a method of manufacturing a heater assembly for heating an aerosol generating material may include forming a susceptor assembly by coupling a susceptor to a support element; locating the susceptor assembly in the accommodation portion for accommodating the aerosol generating material such that the susceptor is spaced apart by a predetermined distance from an inner surface of the accommodation portion by the support element; forming an induction coil in a shape corresponding to an outer surface of the accommodation portion by winding a wire including a conductor, an insulator, and a bonding member; heating the induction coil to a predetermined temperature such that the bonding member melts; cooling the induction coil such that the molten bonding member solidifies and the shape of the induction coil is fixed by the solidified bonding member; and fitting the induction coil around the outer surface of the accommodation portion.

According to a fourth aspect of the present disclosure, a method of manufacturing a heater assembly for heating an aerosol generating material may include forming a susceptor assembly by coupling a susceptor to a support element; locating the susceptor assembly in the accommodation portion for accommodating the aerosol generating material such that the susceptor is spaced apart from an inner surface of the accommodation portion by the support element; forming an induction coil in a shape corresponding to an outer surface of the accommodation portion by winding a wire including a conductor and an insulator; wrapping the induction coil with a bonding element such that a shape of the induction coil is fixed by the bonding element; and fitting the induction coil around the outer surface of the accommodation portion.

Advantageous Effects of Invention

According to the present disclosure, electrical efficiency of a heater assembly may be improved by increasing inductance of an induction coil. In addition, it is possible to improve assembly properties and productivity and to reduce manufacturing cost by simplifying a configuration of a heater assembly.

Effects of the embodiments are not limited to the above-described effects, and undescribed effects will be clearly understood by those skilled in the art related to the present disclosure from the present specification and the accompanying drawings.

BEST MODE FOR CARRYING OUT THE INVENTION

Figure 1:
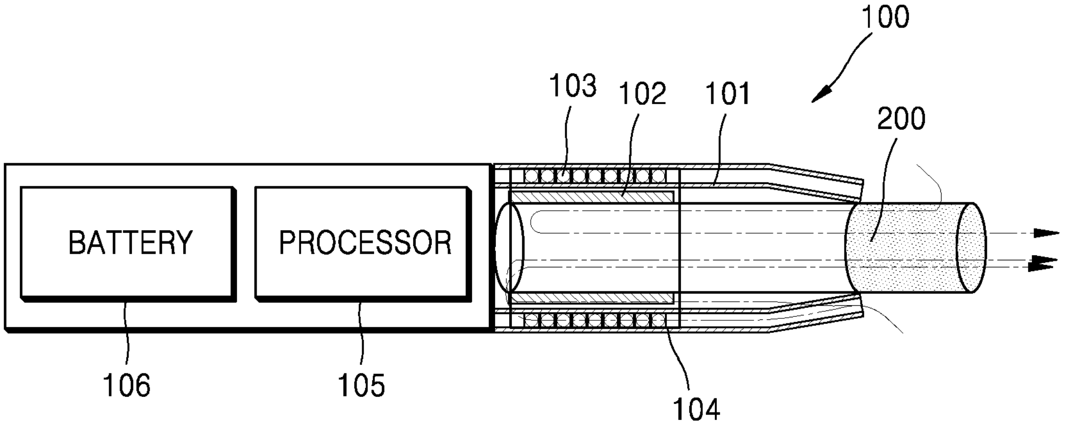
FIG. 1 is a view showing an example in which a cigarette is inserted into an aerosol generating device.

According to the present disclosure, a heater assembly for heating an aerosol generating material may include an accommodation portion configured to accommodate the aerosol generating material; an induction coil coupled to an outer surface of the accommodation portion; a susceptor located in the accommodation portion and configured to generate heat by an alternating magnetic field generated by a current flowing through the induction coil; and a support element coupled to the susceptor such that the susceptor is spaced apart from an inner surface of the accommodation portion by the support element, wherein the induction coil includes a wire including a conductor, an insulator surrounding the conductor, and a bonding member surrounding the insulator.

The induction coil may have a shape corresponding to the outer surface of the accommodation portion, the induction coil may be fixed in the shape when the bonding member is heated to a predetermined temperature and then cooled, and the predetermined temperature may not exceed heat resistance temperatures of the conductor and the insulator, and may be greater than or equal to a heat resistance temperature of the bonding member.

The heater assembly may further include a fixing element arranged in a gap between the support element and the accommodation portion such that the support element is fixed to the accommodation portion.

The susceptor may have a hollow tubular shape having a susceptor opening, and the support element may have a cap shape having a support element opening, a diameter of the support element opening may be greater than a diameter of the susceptor opening, and the support element may be coupled to the susceptor so that the center of the support element opening coincides with the center of the susceptor opening.

The support element may include a first cap and a second cap, and the first cap may wrap at least part of an upper surface of the susceptor and at least part of an outer surface of the susceptor, and the second cap may wrap at least part of a lower surface of the susceptor and at least part of the outer surface of the susceptor.

The bonding member may include at least one of polyamide and polyvinyl butyral.

The support element may include a high heat-resisting material and configured to block heat transfer from the susceptor to the accommodation portion.

The induction coil may include a litz wire made by splicing wires, each of the wires including the conductor, the insulator surrounding the conductor, and the bonding member surrounding the insulator.

According to the present disclosure, a heater assembly for heating an aerosol generating material may include an accommodation portion configured to accommodate the aerosol generating material; an induction coil coupled to an outer surface of the accommodation portion; a susceptor located in the accommodation portion and configured to generate heat by an alternating magnetic field generated by a current flowing through the induction coil; and a support element arranged between the susceptor and the accommodation portion such that the susceptor is separated from an inner surface of the accommodation portion by a predetermined distance, wherein the induction coil includes a wire including a conductor and an insulator surrounding the conductor, and the induction coil is wrapped by a bonding element.

The induction coil may have a shape corresponding to the outer surface of the accommodation portion, and the induction coil may maintain the shape by the bonding element.

The heater assembly may further include a fixing element arranged in a gap between the support element and the accommodation portion such that the support element is fixed to the accommodation portion.

The susceptor may have a hollow tubular shape having a susceptor opening, and the support element may have a cap shape having a support element opening, a diameter of the support element opening may be greater than a diameter of the susceptor opening, and the support element may be coupled to the susceptor so that the center of the support element opening coincides with the center of the susceptor opening.

The support element may include a first cap and a second cap, and the first cap may wrap at least part of an upper surface of the susceptor and at least part of an outer surface of the susceptor, and the second cap may wrap at least part of a lower surface of the susceptor and at least part of the outer surface of the susceptor.

A material of the bonding element may be polyimide.

The support element may be formed of a high heat-resisting material for blocking heat transfer from the susceptor to the accommodation portion.

The induction coil may include a litz wire made by twisting wires.

According to the present disclosure, a method of manufacturing a heater assembly for heating an aerosol generating material may include forming a susceptor assembly by coupling a susceptor to a support element for supporting the susceptor;

locating the susceptor assembly in the accommodation portion for accommodating the aerosol generating material such that the susceptor is spaced apart by a predetermined distance from an inner surface of the accommodation portion by the support element; forming an induction coil in a shape corresponding to an outer surface of the accommodation portion by winding a wire including a conductor, an insulator, and a bonding member; heating the induction coil to a predetermined temperature such that the bonding member melts; cooling the induction coil such that the molten bonding member solidifies and the shape of the induction coil is fixed by the solidified bonding member; and fitting the induction coil around the outer surface of the accommodation portion.

According to the present disclosure, a method of manufacturing a heater assembly for heating an aerosol generating material may include forming a susceptor assembly by coupling a susceptor to a support element; locating the susceptor assembly in the accommodation portion for accommodating the aerosol generating material such that the susceptor is spaced apart from an inner surface of the accommodation portion by the support element; forming an induction coil in a shape corresponding to an outer surface of the accommodation portion by winding a wire including a conductor and an insulator; wrapping the induction coil with a bonding element such that a shape of the induction coil is fixed by the bonding element; and fitting the induction coil around the outer surface of the accommodation portion.

MODE FOR THE INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

The term "aerosol generating article" may refer to any article that is designed for smoking by a person puffing on the aerosol generating article. The aerosol generating article may include an aerosol generating material that generates aerosols when heated even without combustion. For example, one or more aerosol generating articles may be loaded in an aerosol generating device and generate aerosols when heated by the aerosol generating device. The shape, size, material, and structure of the aerosol generating article may differ according to embodiments. Examples of the aerosol generating article may include, but are not limited to, a cigarette-shaped substrate and a cartridge. Hereinafter, the term "cigarette" (i.e., when used alone without a modifier such as "general," "traditional," or "combustive") may refer to an aerosol generating article which has a shape similar to a traditional combustive cigarette.

Hereinafter, the present disclosure will now be described more fully with reference to the accompanying drawings, in which embodiments of the present disclosure are shown such that one of ordinary skill in the art may easily work the present disclosure. The disclosure may, however, be embodied in many different forms and should not be construed as being limited to the embodiments set forth herein.

In addition, terms including ordinal numbers such as "first" or "second" used in the present specification may be used to describe various components, but the components should not be limited by terms. Terms are used only to distinguish one component from another.

In addition, some of the components of the drawings may be shown to be somewhat exaggerated in size and ratio. In addition, components shown on some drawings may not be shown on other drawings.

Hereinafter, the present disclosure will be described in detail with reference to the drawings.

FIG. 1 is a view showing example in which a cigarette is inserted into an aerosol generating device.

Referring to FIG. 1, an aerosol generating device 100 includes a heater assembly 104, a processor 105, and a battery 106. In addition, at least a part of an aerosol generating material or a cigarette 200 may be accommodated in the heater assembly 104 of the aerosol generating device 100.

Only some components of the aerosol generating device 100 related to the present embodiment are shown in FIG. 1. Therefore, those skilled in the art related to the present embodiment may understand that other general-purpose components other than the components shown in FIG. 1 may be further included in the aerosol generating device 100.

FIG. 1 shows that the battery 106, the processor 105, and the heater assembly 104 are arranged in a row. However, an internal structure of the aerosol generating device 100 is not limited to the structure shown in FIG. 1. In other words, the arrangement of the battery 106, the processor 105, and the heater assembly 104 may be changed according to a design of the aerosol generating device 100.

When the cigarette 200 is inserted into the aerosol generating device 100, the aerosol generating device 100 operates the heater assembly 104 to generate an aerosol from the cigarette 200. The aerosol generated by the heater assembly 104 passes through the cigarette 200 to be delivered to a user.

If necessary, the aerosol generating device 100 may operate the heater assembly 104 even when the cigarette 200 is not inserted into the aerosol generating device 100.

The battery 106 supplies power used to operate the aerosol generating device 100. For example, the battery 106 may supply power to allow the heater assembly 104 to operate, and specifically, the battery 106 may supply power to allow the induction coil 103 to generate an alternating magnetic field.

In addition, the battery 106 may supply power required for the processor 105 to operate. In addition, the battery 106 may supply power required to operate a display, a sensor, a motor, and so on installed in the aerosol generating device 100.

The processor 105 controls an overall operation of the aerosol generating device 100. Specifically, the processor 105 controls not only operations of the battery 106 and the induction coil 103 but also operations of other components included in the aerosol generating device 100. In addition, the processor 105 may also determine whether or not the aerosol generating device 100 is in an operable state by checking a state of each component of the aerosol generating device 100.

The processor 105 may be two or more processors. The processor may also consist of an array of a plurality of logic gates or may also consist of a combination of a general-purpose microprocessor and a memory in which a program executable in the microprocessor is stored. In addition, those skilled in the art related to the present embodiment may understand that the processor may consist of another type of hardware.

The heater assembly 104 may be operated by power supplied from the battery 106. For example, when a cigarette is inserted into the aerosol generating device 100, the cigarette may be accommodated in an accommodation portion 101 of the heater assembly 104. Therefore, a heating element of the heater assembly 104 may raise a temperature of an aerosol generating material in the cigarette.

The heating element of the heater assembly 104 may be an induction heating type heater. Specifically, the heater assembly 104 may include an electrically conductive induction coil 103 for heating a susceptor 102 by an induction heating method. The susceptor 102 may be arranged in the aerosol generating device 100 or may be included in the cigarette 200.

However, the heating element is not limited to the above-described example and may be applicable without limitation as long as the heating element may perform heating to a desirable temperature. Here, the desirable temperature may be preset in the aerosol generating device 100 or may be set by a user.

For example, the heater assembly 104 may include a tube-shaped heating element, a plate-shaped heating element, a needle-shaped heating element, or a rod-shaped heating element, and may heat the inside or the outside of the cigarette 200 depending on the shape of the heating element.

In addition, a plurality of heating elements may also be arranged in the aerosol generating device 100. In this case, the heating elements may be arranged to be inserted into the cigarette 200 or may be arranged outside the cigarette 200. According to an embodiment, some of the heating elements included in the plurality of heater assemblies 104 may be arranged to be inserted into the cigarette 200, and the rest may be arranged outside the cigarette 200. In addition, the shape of the heater assembly 104 is not limited to the shape shown in FIG. 1 and may be variously formed.

In addition, the induction coil 103 may be located around the accommodation portion 101. FIG. 1 shows that the induction coil 103 is arranged to surround the accommodation portion 101, but it is not limited thereto.

When the cigarette 200 is accommodated in the accommodation portion 101 of the aerosol generating device 100, the aerosol generating device 100 may supply power to the induction coil 103 such that the induction coil 103 generates an alternating magnetic field. As the alternating magnetic field generated by the induction coil 103 passes through the susceptor 102, the susceptor 102 may be heated. As the aerosol generating material in the cigarette 200 is heated by the heated susceptor 102, an aerosol may be generated. The generated aerosol passes through the cigarette 200 to be delivered to a user.

The induction coil 103 may be an electrically conductive coil that generates an alternating magnetic field by using power supplied from the battery 106. The induction coil 103 may be arranged to surround at least a part of the accommodation portion 101. The alternating magnetic field generated by the induction coil 103 may be applied to the susceptor 102 arranged at an inner side of the accommodation portion 101.

The susceptor 102 may be heated as the alternating magnetic field generated by the induction coil 103 passes through the susceptor 102 and may include metal or carbon. For example, the susceptor 102 may include at least one of ferrite, a ferromagnetic alloy, stainless steel, and aluminum.

In addition, the susceptor 102 may include ceramic (e.g., graphite, molybdenum, silicon carbide, niobium, a nickel alloy, a metal film, or zirconia), a transition metal (e.g., nickel (Ni) or cobalt (Co)), and/or a metalloid (e.g., boron (B) or phosphorus (P)). However, the susceptor 102 is not limited to the above-described example and may be applicable without limitation as long as the susceptor may be heated to a desirable temperature as an alternating magnetic field is applied. Here, the desirable temperature may be preset in the aerosol generating device 100 or may be set by a user.

When the cigarette 200 is accommodated in the accommodation portion 101 of the aerosol generating device 100, the susceptor 102 may be located outside the cigarette 200. Therefore, the heated susceptor 102 may increase a temperature of the aerosol generating material in the cigarette 200.

FIG. 1 shows that the susceptor 102 is arranged to surround and heat the outside of the cigarette 200, but it is not limited thereto. For example, the susceptor 102 may have a tubular shape, a plate shape, a needle shape or a rod shape, and may be arranged to heat the inside or the outside of the cigarette 200 depending on the shape of the susceptor 102.

In addition, a plurality of susceptors 102 may also be arranged in the aerosol generating device 100. In this case, the plurality of susceptors 102 may be arranged to be inserted into the cigarette 200 or may be arranged outside the cigarette 200. According to an embodiment, some of the plurality of susceptors 102 may be arranged to be inserted into the cigarette 200, and the rest may be arranged outside the cigarette 200. In addition, the shape of the susceptor 102 is not limited to the shape shown in FIG. 1 and may be variously formed.

In addition, the aerosol generating device 100 may include other general-purpose components in addition to the heater assembly 104, the processor 105, and the battery 106. For example, the aerosol generating device 100 may include a display capable of outputting visual information and/or a motor for outputting tactile information. In addition, the aerosol generating device 100 may include at least one sensor (e.g., a puff detection sensor, a temperature detection sensor, a cigarette insertion detection sensor, or so on). In addition, the aerosol generating device 100 may have a structure in which external air may flow in or internal gas may flow out even while the cigarette 200 is inserted in the aerosol generating device 100.

Although not shown in FIG. 1, the aerosol generating device 100 may also constitute a system together with a separate cradle. For example, the cradle may be used to charge the battery 106 of the aerosol generating device 100. The heater assembly 104 may also be heated while the cradle and the aerosol generating device 100 are coupled to each other.

The cigarette 200 may be similar to a general combustion type cigarette in shape and structure. For example, the cigarette 200 may be divided into a first portion including an aerosol generating material and a second portion including a filter. According to an embodiment, an aerosol generating material may also be included in the second portion of the cigarette 200. For example, an aerosol generating material made in the form of granules or capsules may also be inserted into the second portion.

When the cigarette is loaded in the aerosol generating device 100, the entire first portion may be inserted into the aerosol generating device 100 and the second portion may be exposed to the outside. According to an embodiment, only part of the first portion may be inserted into the aerosol generating device 100. According to an embodiment, the entire first portion and art of the second part may also be inserted into the aerosol generating device 100. A user may puff an aerosol while holding the second portion by the mouth of the user. In this case, the aerosol is generated as external air passes through the first portion, and the generated aerosol is delivered to the mouth of the user through the second portion.

As an example, external air may flow in through at least one air passage formed in the aerosol generating device 100. For example, opening and closing of the air passage formed in the aerosol generating device 100 and/or a size of the air passage may be adjusted by a user. Accordingly, the amount of smoke (i.e., aerosol) and a smoking feeling may be adjusted by the user. As another example, external air may also flow into the cigarette 200 through at least one hole formed in a surface of the cigarette 200.

Hereinafter, an example of the cigarette 200 will be described with reference to FIG. 2.

Figure 2:
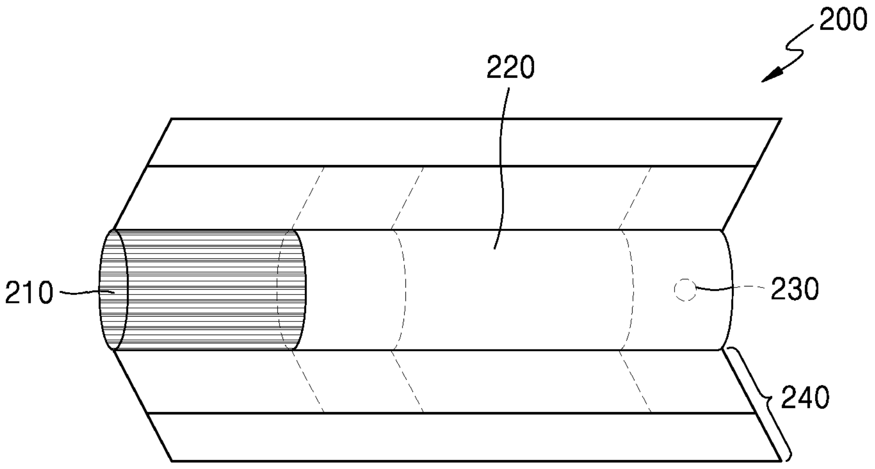
FIG. 2 shows a view showing an example of a cigarette.

FIG. 2 shows a view showing an example of a cigarette.

Referring to FIG. 2, the cigarette 200 includes a tobacco rod 210 and a filter rod 220. The first portion described above with reference to FIG. 1 may include the tobacco rod 210, and the second portion may include the filter rod 220.

FIG. 2 illustrates that the filter rod 220 includes a single segment, but is limited thereto. In other words, the filter rod 220 may include a plurality of segments. For example, the filter rod 220 may include a first segment configured to cool an aerosol and a second segment configured to filter a certain component included in the aerosol. Also, as necessary, the filter rod 220 may further include at least one segment configured to perform other functions.

The cigarette 200 may be packaged by at least one wrapper 240. The wrapper 240 may have at least one hole through which external air may be introduced or internal air may be discharged. For example, the cigarette 200 may be packaged by one wrapper 240. As another example, the cigarette 200 may be doubly packaged by two or more wrappers 240. For example, the tobacco rod 210 may be packaged by a first wrapper, and the filter rod 220 may be packaged by a second wrapper. Also, the tobacco rod 210 and the filter rod 220, which are respectively packaged by separate wrappers, may be coupled to each other, and the entire cigarette 200 may be packaged by a third wrapper. When each of the tobacco rod 210 or the filter rod 220 is composed of a plurality of segments, each segment may be packaged by separate wrappers. Also, the entire cigarette 200 including the plurality of segments, which are respectively packaged by the separate wrappers and which are coupled to each other, may be repackaged by another wrapper.

The tobacco rod 210 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 210 may include other additives, such as flavors, a wetting agent, and/or organic acid. Also, the tobacco rod 210 may include a flavored liquid, such as menthol or a moisturizer, which is injected to the tobacco rod 210.

The tobacco rod 210 may be manufactured in various forms. For example, the tobacco rod 210 may be formed as a sheet or a strand. Also, the tobacco rod 210 may be formed as a pipe tobacco, which is formed of tiny bits cut from a tobacco sheet. Also, the tobacco rod 210 may be surrounded by a heat conductive material.

For example, the heat-conducting material may be, but is not limited to, a metal foil such as aluminum foil. For example, the heat conductive material surrounding the tobacco rod 210 may uniformly distribute heat transmitted to the tobacco rod 210, and thus, the heat conductivity applied to the tobacco rod may be increased and taste of the tobacco may be improved. Also, the heat conductive material surrounding the tobacco rod 210 may function as a susceptor heated by the induction heater. Here, although not illustrated in the drawings, the tobacco rod 210 may further include an additional susceptor, in addition to the heat conductive material surrounding the tobacco rod 210.

The filter rod 220 may include a cellulose acetate filter. Shapes of the filter rod 220 are not limited. For example, the filter rod 220 may include a cylinder-type rod or a tube-type rod having a hollow inside. Also, the filter rod 220 may include a recess-type rod. When the filter rod 220 includes a plurality of segments, at least one of the plurality of segments may have a different shape.

The filter rod 220 may be formed to generate flavors. For example, a flavoring liquid may be injected onto the filter rod 220, or an additional fiber coated with a flavoring liquid may be inserted into the filter rod 220. Also, the filter rod 220 may include at least one capsule 230. Here, the capsule 230 may perform a function of generating a flavor or an aerosol. For example, the capsule 230 may have a configuration in which a liquid containing a flavoring material is wrapped with a film. For example, the capsule 230 may have a spherical or cylindrical shape, but is not limited thereto.

When the filter rod 220 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and is not limited as long as the cooling segment cools the aerosol.

Meanwhile, although not illustrated in FIG. 2, the cigarette 200 according to an embodiment may further include a front-end filter. The front-end filter may be located on one side of the tobacco rod 210 which is opposite to the filter rod 220. The front-end filter may prevent the tobacco rod 210 from being detached outwards and prevent the liquefied aerosol from flowing from the tobacco rod 210 into the aerosol generating device (100 of FIG. 1), during smoking.

Hereinafter, a heater assembly will be described with reference to FIGS. 3A and 3B.

Figure 3A:
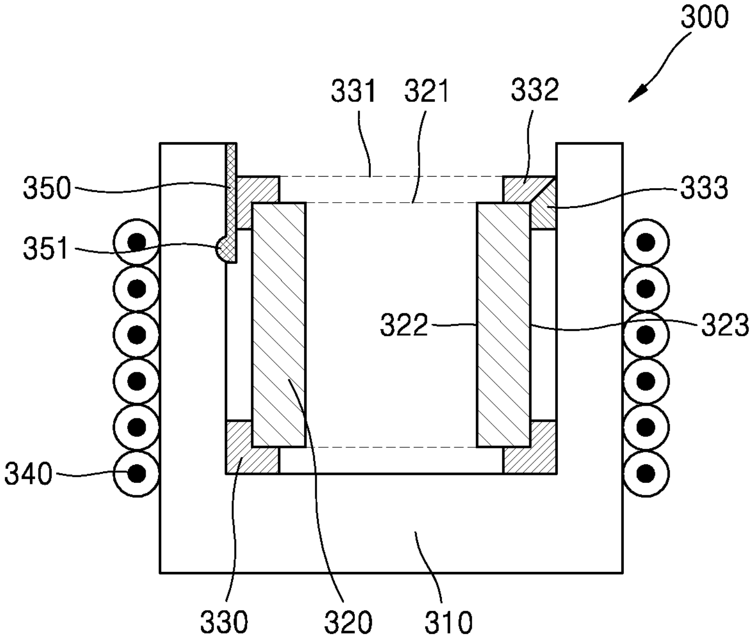
FIG. 3A is a cross-sectional view of a heater assembly according to an embodiment.

FIG. 3A is a cross-sectional view of a heater assembly according to an embodiment.

FIG. 3A shows components of a heater assembly 300 for heating an aerosol generating material. The heater assembly 300 may include an accommodation portion 310 that accommodates an aerosol generating material, an induction coil 340 wound around an outer surface of the accommodation portion 310, and a susceptor 320 that is located in the accommodation portion 310. The susceptor 320 may be heated by an alternating magnetic field, which is induced by a current flowing through the induction coil 340.

In addition, the heater assembly 300 may include a support element that fixes a position of the susceptor 320 and separates the susceptor 320 by a predetermined distance from an inner surface of the accommodation portion 310, and a fixing element 350 that fixes the support element 330 to the accommodation portion 310 by being fitted into a gap between the support element and the accommodation portion 310.

However, it is obvious to those skilled in the art that some of the components of the heater assembly 300 shown in FIG. 3A may be omitted or other general-purpose components may be further included therein.

The accommodation portion 310 according to an embodiment may have a cylindrical shape. Specifically, the accommodation portion 310 may have an opening on one side and a cavity.

Components such as a susceptor 320, a support element 330, and a fixing element 350 may be located in the cavity of the accommodation portion 310, and an induction coil 340 may be wound around the outside of the accommodation portion 310. In addition, an aerosol generating material or a cigarette may be loaded in the cavity of the accommodation portion 310.

The accommodation portion 310 is not limited to a particular shape. For example, the accommodation portion 310 may have a square pillar shape or a triangular pillar shape. The shape of the induction coil 340 formed by a wire wound around an outer surface of the accommodation portion 310 may correspond to the shape of the accommodation portion 310. For example, the induction coil 340 may have a square pillar shape or a triangular pillar shape.

The susceptor 320 may be located in the accommodation portion 310. A horizontal cross section of the susceptor 320 taken perpendicular to a longitudinal direction of the accommodation portion 310 may be circular. A space between the susceptor 320 and the accommodation portion 310 may be changed according to a cross-sectional shape of the accommodation portion 310.

For example, if the accommodation portion 310 has a square pillar shape, a cross-section thereof may be a square. In this case, when a tubular susceptor 320 is located in the accommodation portion 310, a space may be formed between the inner surface of the accommodation portion 310 and the susceptor 320. Accordingly, heat generated by the susceptor 320 may be better dissipated to the outside of the heater assembly 300.

In addition, the accommodation portion 310 may be formed of a plastic polyetherether ketone (PEEK) material which has excellent molding processability, such that the accommodation portion 310 may be easily manufactured in a desirable shape. In addition, the PEEK has high heat resistance, excellent abrasion resistance, impact resistance, and hydrolysis resistance, thus durability of the heater assembly 300 may be improved.

The susceptor 320 may be located in the accommodation portion 310 and may have various shapes to heat an aerosol generating material or a cigarette.

FIG. 3A shows the heater assembly 300 according to an embodiment. The susceptor according to an embodiment may have a tube shape (hereinafter, referred to as a "hollow tubular susceptor 320").

An inner diameter of the hollow tubular susceptor 320 may be designed such that an aerosol generating material or an outer surface of a cigarette accommodated in the accommodation portion 310 comes into contact with or is close enough to receive heat from an inner surface 322 of the hollow tubular susceptor 320.

In addition, a length (i.e., a height) of the hollow tubular susceptor 320 may be designed to heat a portion that needs to be heated in a cigarette, for example, a portion including an aerosol generating material in the cigarette. As the hollow tubular susceptor 320 is designed to have dimensions suitable for heating an aerosol generating material or a cigarette, the aerosol generating device including the heater assembly 300 may efficiently generate an aerosol.

In addition, the hollow tubular susceptor 320 may be spaced apart from an inner surface of the accommodation portion 310 by the support element 330. In addition, the hollow tubular susceptor 320 may be coupled to the support element 330 to form a susceptor assembly and may be fixed to the accommodation portion 310. Details will be described below together with the support element.

In addition, the hollow tubular susceptor 320 may be arranged so that the accommodation portion 310 and the hollow tubular susceptor 320 have a common central vertical axis. As such, an aerosol generating material or a cigarette may be easily inserted into the hollow tubular susceptor 320.

In addition, the susceptor 320 may be heated by an induction current or a counter electromotive force generated due to a change in an alternating magnetic field generated by an alternating current flowing through the induction coil 340. Specifically, the susceptor 320 may be heated by an eddy current loss or a hysteresis loss due to a current induced in the susceptor 320 according to electromagnetic properties of a material forming the susceptor.

The support element 330 may have a configuration that fixes a position of the susceptor and separate the susceptor 320 from the inner surface of the accommodation portion 310 by a predetermined distance to prevent heat generated by the susceptor from being directly conducted to the accommodation portion 310. One or more support elements 330 may be included in the heater assembly 300.

The support element 330 according to an embodiment may have a cap shape (hereinafter, referred to as a "cap-shaped support element 330"). A horizontal cross-section of the cap-shaped support element 330 may be a ring shape. The cap-shaped support element 330 may have an upper portion 332 and a side portion 333 vertically extending from an outer edge of the upper portion 332.

In addition, a support element opening 331 may be formed in the upper portion 332 of the cap-shaped support element 330. A diameter of the support element opening 331 may be greater than a diameter of a susceptor opening 321. An aerosol generating material or a cigarette may be inserted in the hollow tubular susceptor 320 through the susceptor opening 321.

Accordingly, the cap-shaped support element 330 may be coupled to the hollow tubular susceptor 320 so that the center of the support element opening 331 coincides with the center of the susceptor opening 321, thereby forming a susceptor assembly.

Because the diameter of the support element opening 331 is greater than the diameter of the susceptor opening 321, the cap-shaped support element 330 may not cover the susceptor opening 321 of the hollow tubular susceptor 320 in a state in which the hollow tubular susceptor 320 and the cap-shaped support element 330 are coupled to each other. Accordingly, a cigarette may be inserted into the hollow tubular susceptor 320 without being disturbed by the cap-shaped support element 330.

In addition, the cap-shaped support element 330 may include a first cap and a second cap. The first cap may cover at least a part of an upper surface and an outer surface of the hollow tubular susceptor 320, and the second cap may cover at least a part of a lower surface and the outer surface of the hollow tubular susceptor 320. Accordingly, the hollow tubular susceptor 320 may not be in direct contact with the accommodation portion 310.

The cap-shaped support element 330 has the side portion 333 extending vertically from an outer edge of the upper portion 332, thereby covering a part of an outer surface 323 of the hollow tubular susceptor 320. Accordingly, the upper surface, the lower surface, and the outer surface of the hollow tubular susceptor 320 may be in contact with the cap-shaped support element 330, and thereby, the hollow tubular susceptor 320 and the cap-shaped support element 330 may be more firmly coupled to each other.

Figure 3B:
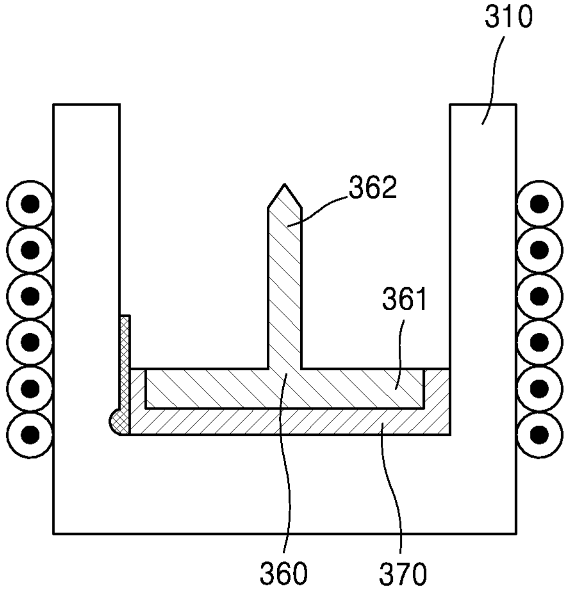
FIG. 3B is a cross-sectional view of a heater assembly according to another embodiment.

FIG. 3B is a cross-sectional view of a heater assembly according to another embodiment.

FIG. 3B shows a heater assembly 300 according to another embodiment. The heater assembly according to the present embodiment may include a susceptor 360 (hereinafter, referred to as a "needle-type susceptor") including a support portion 361 provided at a lower portion and a protrusion 362 protruding from the center of the support portion 361. The protrusion 362 may be formed in a needle shape having a sharp end. However, the present disclosure is not limited thereto, and the protrusion may be implemented in various manners. For example, the protrusion may have a tubular shape or may be implemented by a plurality of needle shape protrusions.

According to an embodiment, the needle-type susceptor 360 may have a roundish end, instead of the pointy end as shown in FIG. 3B. That is, the needle-type susceptor 360 may be employed without limitation in shape as long as the susceptor may perform a function of heating an aerosol generating material or a cigarette.

The protrusion 362 of a needle shape may be designed to be in thermal contact with the aerosol generating material or the inside of a cigarette accommodated in the accommodation portion 310. In addition, a length of the needle-type susceptor 360 may be designed to reach a portion that needs to be heated in an aerosol generating material or a cigarette.

The support element 370 according to an embodiment (hereinafter, referred to as a "pedestal-type support element") may be arranged to support a lower end of the support portion 361 of the needle-type susceptor 360. That is, the protrusion 362 may be formed on one side (e.g., top surface) of the support portion 361, and the needle-type susceptor 360 support the opposite side (e.g., bottom surface).

Specifically, a pedestal-type support element 370 may be coupled to a lower end of the support portion 361 of the needle-type susceptor 360 to form a susceptor assembly. Specifically, the pedestal-type support element 370 may support the needle-type susceptor 360 by covering a lower surface and an outer portion of the support portion.

The heater assembly 300 to which the needle-type susceptor 360 is applied may directly heat an aerosol generating material or the inside of a cigarette, and thus, heating efficiency of an aerosol generating device may be increased.

The susceptor assembly including the susceptor and the support element may be inserted into the accommodation portion 310 by an interference fit method to be fixed inside the accommodation portion 310. In addition, the susceptor and the accommodation portion 310 are physically separated by a support element so that there is no mutual contact surface, and thus, heat generated by the susceptor may be prevented from being directly transferred to the accommodation portion 310.

The induction coil 340 may be a wire wound around an outer surface of the accommodation portion 310. The shape of the induction coil 340 may correspond to the shape of the accommodation portion 310.

For example, when the accommodation portion 310 has a cylindrical shape, the induction coil 340 may be wound in a cylindrical shape. In addition, the wire may be wound so that a length of the induction coil 340 is the same as the length of the susceptor.

As will be described below in FIG. 5, an inductance value of the induction coil 340 is changed according to the length and cross-sectional area of the induction coil 340, and thus, heating efficiency may be changed according to the shape and dimensions of the induction coil 340.

In addition, a bobbin may be used as a frame for forming the induction coil 340 having a shape of a wire wound around an outer surface of the accommodation portion. As will be described below in FIG. 7, when the shape of the induction coil 340 is determined, a suitable bobbin is made and a wire is wound around the bobbin to make the induction coil 340, and the induction coil 340 having a desirable shape may be mass-produced by separating the bobbin and the induction coil 340.

According to an embodiment, the fixing element 350 may be further included in the heater assembly 300. Even though the heater assembly 300 has the support element 330, the susceptor assembly may not be firmly fixed inside the accommodation portion 310 due to a tolerance of each component.

The fixing element 350 may be inserted into a gap between the support element 330 and the accommodation portion 310 to fix the support element 330 to the accommodation portion 310. As such, the entire susceptor assembly may be firmly fixed inside the accommodation portion 310.

Specifically, a protrusion 351 may be formed at one end of the fixing element 350, and a groove capable of being coupled to the protrusion 351 may be formed in an inner surface of the accommodation portion 310. As the protrusion 351 is coupled to the groove of the accommodation portion 310, the susceptor assembly may be more firmly fixed inside the accommodation portion 310.

Figure 4A:
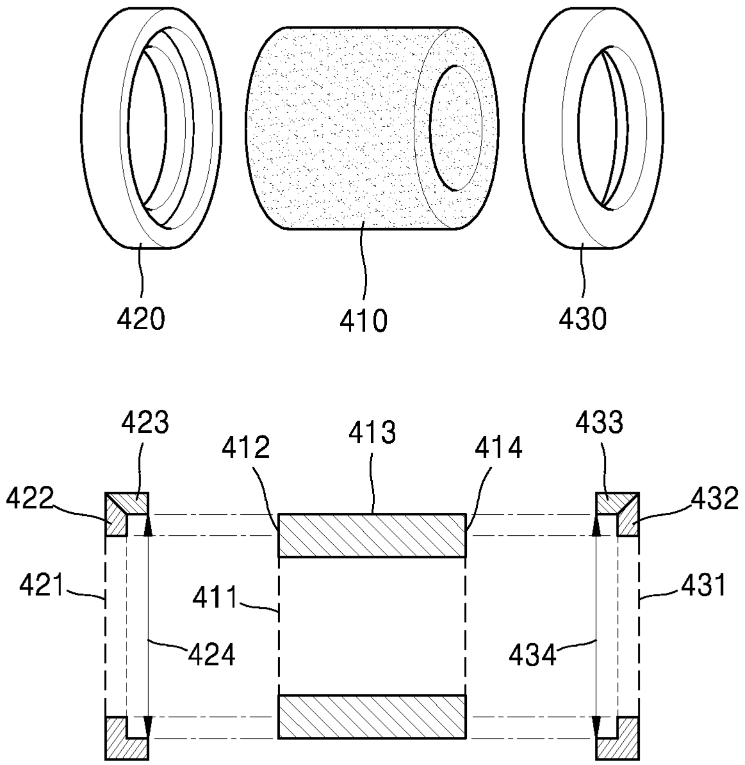
FIG. 4A is an exploded view of a susceptor assembly according to an embodiment.

FIG. 4A is an exploded view of a susceptor assembly according to an embodiment.

FIG. 4A shows a hollow tubular susceptor 410 and two cap-shaped support elements 420 and 430. The left cap-shaped support element of the hollow tubular susceptor 410 will be referred to as a first cap 420, the right cap-shaped support element will be referred to as a second cap 430.

The hollow tubular susceptor 410 may be coupled to the first cap 420 at one end (hereinafter referred to as "first end"), and may be coupled to the second cap 430 at the other end (hereinafter referred to as "second end").

As shown, the hollow tubular susceptor 410 may have an opening (hereinafter, referred to as a "susceptor opening 411") in the first and second ends. In addition, the support elements 420 and 430 may have an opening (hereinafter, referred to as a "support element opening"). As shown in FIG. 4A, the support element opening may be formed in each of the first cap 420 and the second cap 430.

For example, a diameter of a first opening 421 formed in an upper portion 422 of the first cap 420 may be greater than a diameter of the susceptor opening 411. In addition, a diameter of a second opening 431 formed in an upper portion 432 of the second cap 430 may be greater than the diameter of the susceptor opening 411.

Referring to FIG. 4A, the first cap 420 may include a first upper portion 422 and a first side portion 423. The first upper portion 422 may cover at least a part of an upper surface 412 of the hollow tubular susceptor 410, and the first side portion 423 may cover at least a part of an outer surface 413 of the hollow tubular susceptor 410.

In addition, the second cap 430 may include a second upper portion 432 and a second side portion 433. The second upper portion 432 may cover at least a part of a lower surface 414 of the hollow tubular susceptor 410, and the second side portion 433 may cover at least a part of the outer surface 413 of the hollow tubular susceptor 410.

Accordingly, the first cap 420 and the second cap 430 may be coupled to the hollow tubular susceptor 410 to form a susceptor assembly.

In addition, the first cap 420 and the second cap 430 may be designed with an interference fit tolerance so that the inner diameters 424 and 434 of the side portions 423 and 433 of the support elements are smaller than an outer diameter of the hollow tubular susceptor 410.

Accordingly, the first cap 420 and the second cap 430 may be coupled to the hollow tubular susceptor 410 without an additional fastening element or an adhesive material. As a result, a production process may be simplified and a production cost may be reduced.

Figure 4B:
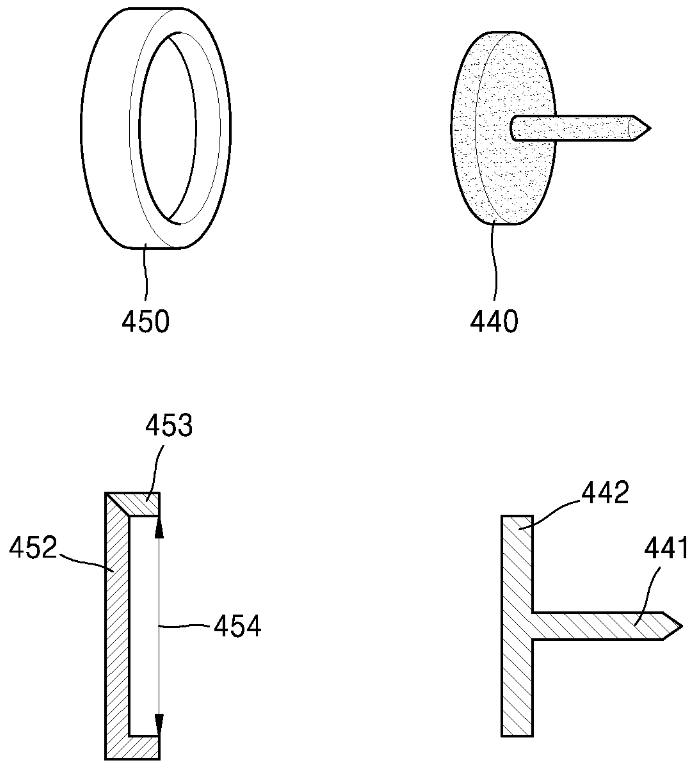
FIG. 4B is an exploded view of a susceptor assembly according to another embodiment.

FIG. 4B is an exploded view of a susceptor assembly according to another embodiment.

FIG. 4B shows a needle-type susceptor 440 and a pedestal-type support element 450. As shown, the needle-type susceptor 440 may include a protrusion 441 and a support portion 442. The protrusion 441 protrudes on an upper surface of the support portion 442. In addition, the pedestal-type support element 450 may include a lower portion 452 and a side portion 453. When the needle-type susceptor 440 and the pedestal-type support element 450 are combined, the lower surface of the needle-type susceptor 440 faces the upper surface of the lower portion 452 of the pedestal-type support element 450. Although not shown, an opening may be formed in the lower portion 452 of the pedestal-type support element 450.

The lower portion 452 may cover at least a part of a lower surface of the support portion 442, and the side portion 453 may cover at least a part of an outer surface (i.e., side surface) of the support portion 442. Accordingly, the needle-type susceptor 440 and the pedestal-type support element 450 may be coupled to each other to form the susceptor assembly.

In addition, the pedestal-type support element 450 may be designed with an interference fit tolerance so that an inner diameter 454 of the side portion 453 is smaller than a diameter of the support portion 442 of the needle-type susceptor 440. Accordingly, the needle-type susceptor 440 and the pedestal-type support element 450 may be coupled to each other without a separate fastening element or an adhesive material.

The susceptor may generate heat for heating an aerosol generating material or a cigarette, which may have a temperature of approximately 300° C. or higher. A support element may serve to reduce heat being transferred to an accommodation portion from the susceptor.

The support element may be formed of a material with a low thermal conductivity to minimize high-temperature heat being transferred to the accommodation portion from the susceptor. In addition, the support element may be made of a high heat-resisting material so as not to be melted by high-temperature heat.

In addition, the support element may be formed of a material with excellent mechanical properties so as not to have a change in shape due to heat. In addition, the support element may be formed of a material with excellent electrical properties to be electrically insulated from the accommodation portion and the induction coil. For example, the support element may be formed of PLAVIS.

The PLAVIS is a plastic material and has mechanical characteristics including high heat resistance, high abrasion resistance, and low friction, and it also has electrical characteristics including excellent electrical insulation. Thus, the PLAVIS may be a suitable material for a support element.

Specifically, the PLAVIS may be used stably at a high temperature of approximately 300° C., and may have a high PV value over a wide temperature range and a low friction coefficient. Also, it has a high tensile strength against temperature and excellent creep properties at a high temperature. As such, a possibility of deformation due to heat may be reduced. In addition, because the PLAVIS maintains electrical insulation over a wide temperature range, it is possible to reduce a chance of a short-circuit between the induction coil and the susceptor.

Figure 5:
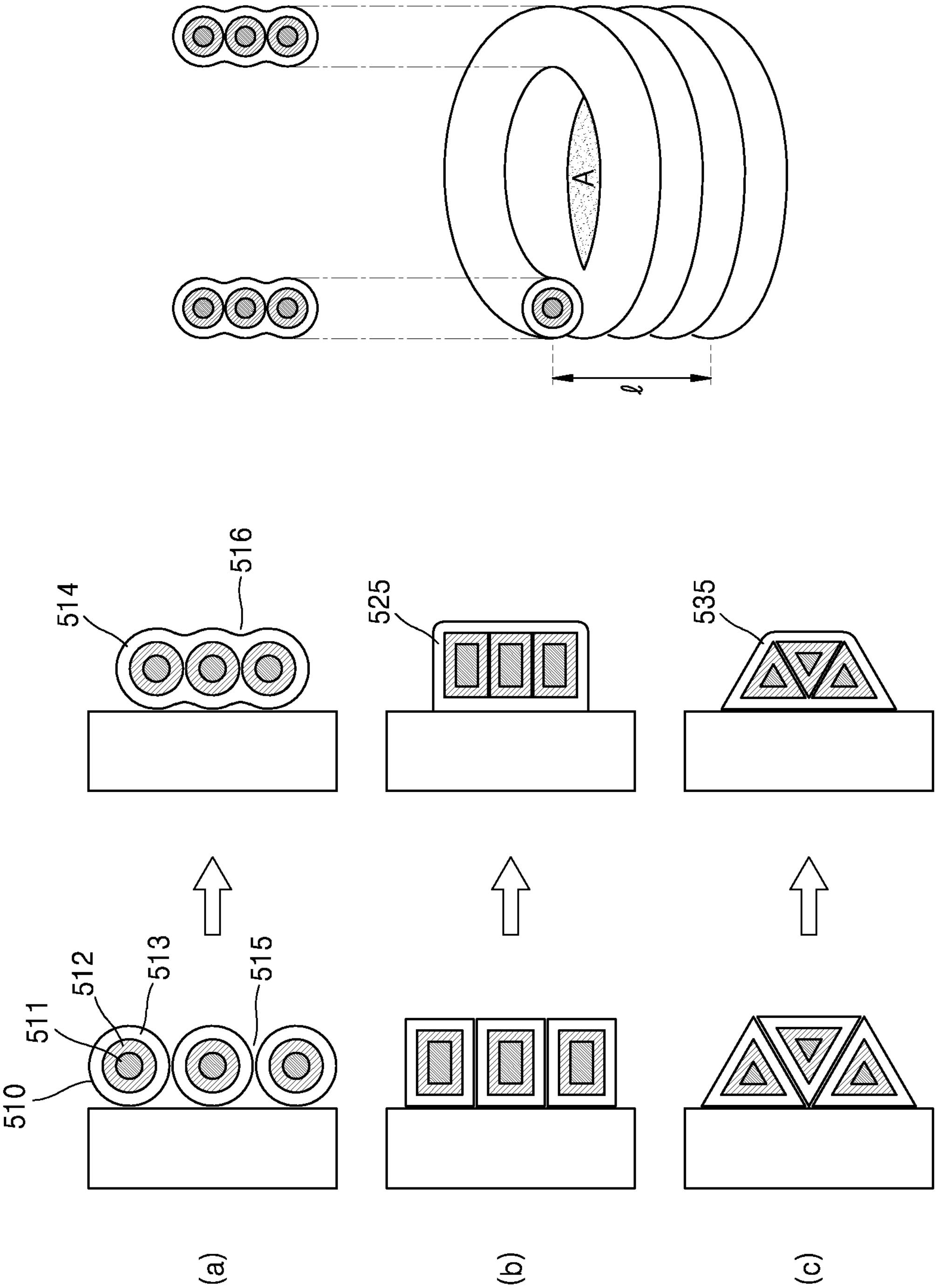
FIG. 5 shows cross-sectional views of induction coils including bonding members according to various embodiments.

FIG. 5 shows cross-sectional views of induction coils including bonding members according to various embodiments.

According to an embodiment, a wire may have a circular cross-sectional shape (a), a square cross-sectional shape (b), or a triangular cross-sectional shape (c). However, the present disclosure is not limited thereto, and those skilled in the art related to the present embodiment may understand that other shapes other than the above-described cross-sectional shapes may be employed.

In addition, a wire may include a conductor 511, an insulator 512, and a bonding member 513. Specifically, the insulator 512 may be formed coaxially with the conductor 511 on the outside of the conductor 511, and the bonding member 513 may be formed coaxially with the insulator 512 on the outside of the insulator 512. Although FIG. 5 shows that the bonding member 513 is included, the bonding member 513 may not be included.

The inductance value of an induction coil is proportional to the number of turns of the wire per unit length as shown in following Equation 1.

$$L=\mu_o n^2 lA \qquad \text{Equation 1}$$

where $\mu_o$ is permeability in vacuum, n is the number of turns of wire per unit length, 1 is a length of the induction coil, and A is a cross-sectional area of the induction coil.

The induction coil to which an AC current is applied may generate a counter electromotive force, which is proportional to an inductance value as shown in following Equation 2.

$$V = -L\frac{di}{dt} \qquad \text{Equation 2}$$

where V is the counter electromotive force, L is inductance of the induction coil, and $$\frac{di}{dt}$$

is proportional to the larger the number n of turns of wire per unit length, the larger the length I of the induction coil, and the cross-sectional area A (i.e., a horizontal cross-sectional area taken along a length direction of the induction coil as shown in FIG. 5). Thus, electrical efficiency of the induction coil may be improved by controlling these parameters.

The number of turns of wire per unit length of the induction coil may change depending on cross-sectional shapes of the wire. For example, referring to FIG. 5, a coil formed by a wire having a triangular cross-sectional shape of (c) may have a larger number of turns than a coil formed by a wire having a circular cross-sectional shape of (a) for the same cross sectional area.

In this way, the induction coil may be formed of wires having various cross-sectional shapes by considering a production cost and electrical efficiency. In addition, the shape of the induction coil changes depending on the shapes of a bobbin around which the wire is wound, and thus, an inductance value may be adjusted by changing a cross-sectional area of the induction coil.

The induction coil according to an embodiment may be formed of a wire 510 having a circular cross-sectional shape. The wire may be wound around a bobbin, such that an induction coil may be coupled to an outer surface of an accommodation portion.

In addition, when heat treatment is performed on the bonding member 513 while wires are wound, the wires may be bonded to each other, and thereby, the shape of the induction coil may be fixed.

For example, a heat treatment temperature may be less than or equal to heat resistance temperatures of the conductor 511 and the insulator 512, and may be greater than or equal to a heat resistance temperature of the bonding member 513. As the bonding member 513 is melted by the heat treatment, a gap between adjacent wires to be narrowed and the number of turns of wire per unit length may be increased.

When the bonding member 513 is cooled after the heat treatment, the bonding member 513 may be solidified and the adjacent wires may be bonded to each other. Accordingly, the shape of the induction coil may be fixed.

Specifically, the bonding member 513 is melted during the bonding of the wires, a space between the adjacent wires of the induction coil may be minimized Referring to a reference numeral 515, a space between adjacent wires may be wide before the adjacent wires are bonded to each other. On the other hand, referring to a reference numeral 516, a space between adjacent wires is reduced and fixed after the adjacent wires are bonded to each other. Thus, the space between the adjacent wires may be minimized.

As the number of turns of wire per unit length of the induction coil increases, the inductance value may increase. Accordingly, heating efficiency of a heater assembly may be increased, and power consumption of an aerosol generating device using the heater assembly may be reduced.

As shown in FIG. 5, bonding of the wires may be made in different shapes depending on cross-sectional shape of the wire. In addition, the wires may be bonded differently depending on a heat treatment method of the bonding member 513, a heat treatment condition (such as a heat treatment temperature or a heat treatment time), and a method of winding a wire on a bobbin. Accordingly, an induction coil having various inductance values may be manufactured.

According to an embodiment, wires of an induction coil may be bonded to each other so that a cross-section of the bonded wires has a roundish shape 514. According to another embodiment, wires of an induction coil may be bonded to each other so that a cross-section of the bonded wires has a rectangular shape 525. According to another embodiment, wires of an induction coil may be bonded to each other so that a cross-section of the bonded wires has a trapezoid shape 535.

In addition, an induction coil formed of a wire including the bonding member 513 may be heated after the wire is wound, or may be heated by joule's heat generated by current flow through the coil, so that the wires can be bonded. Accordingly, a shape of the induction coil may be fixed without additional fixing procedure, and thus, a production process of the induction coil may be simplified.

In addition, according to a method of fixing an induction coil by using the bonding member 513, the wires may be bonded by the melted bonding member 513 even in a gap between the wires, and thus, the shape of the induction coil may be more firmly fixed. Accordingly, manufacturability of the induction coil may be improved and assembly procedures of the induction coil and an accommodation portion may be simplified. As a result, the product quality may be improved and the manufacturing costs may be reduced.

The bonding member 513 may include polyamide and/or polyvinyl butyral (PVB). It is known that polyamide has excellent adhesiveness and a high melting point due to hydrogen bonds. Also, since polyvinyl butyral has excellent adhesion and thermosetting properties, the polyvinyl butyral may be a suitable material for fixing a shape of an induction coil by bonding wires.

In addition, a wire forming an induction coil may include a litz wire which is made by splicing thin wires, each of which includes the conductor 511, the insulator 512 surrounding the conductor 511, and the bonding member 513 surrounding the conductor 511.

Specifically, the litz wire may be made by weaving 10 to 100 thin conductive wires, each having a diameter of approximately 0.1 mm, to increase a surface area from a physical point of view and to provide excellent frequency characteristics from an electrical point of view. Accordingly, a skin effect may be reduced, effective resistance of the wire may be reduced, and heating efficiency of an induction coil according to a high-frequency alternating current may be increased.

Figure 6:
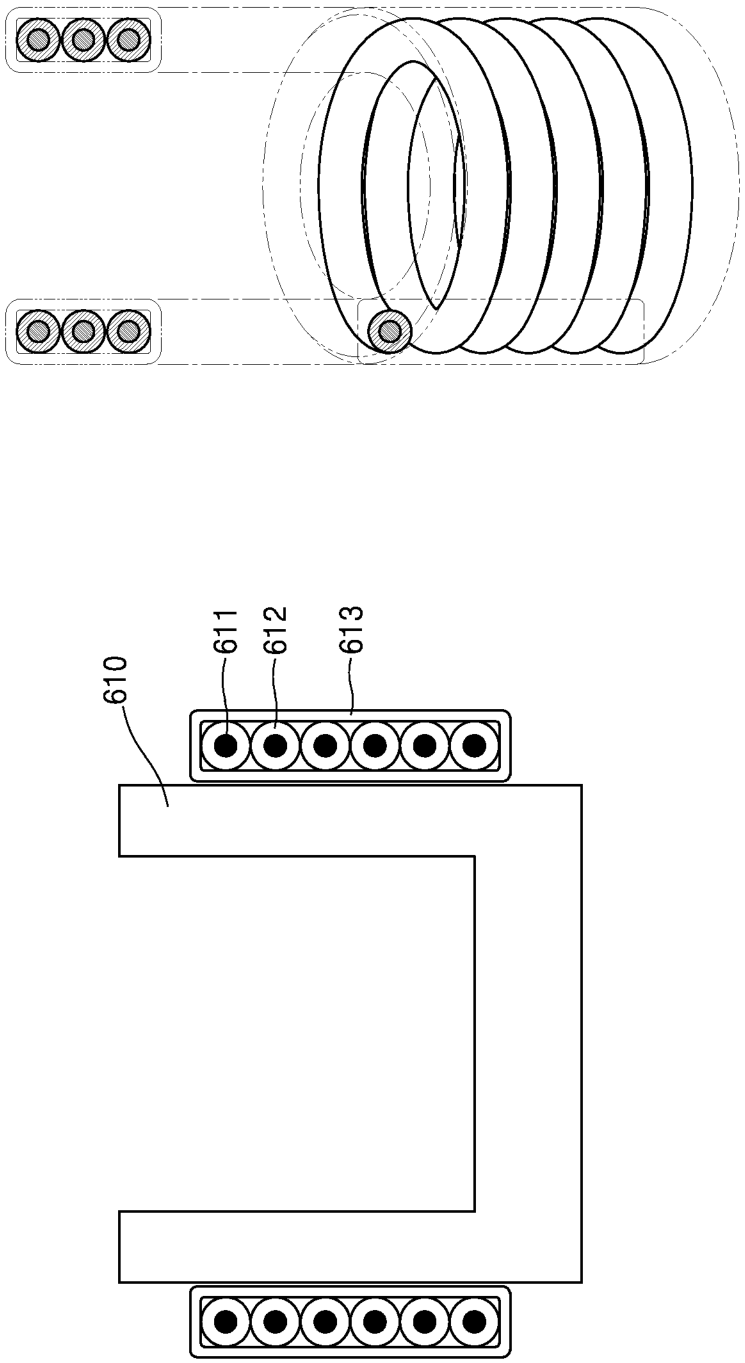
FIG. 6 shows a cross-sectional view of an induction coil wrapped by a bonding element according to an embodiment.

FIG. 6 is a cross-sectional view of an induction coil wrapped by a bonding element according to an embodiment.

According to an embodiment, an induction coil is wound around an outer surface of an accommodation portion 610 that accommodates an aerosol generating material. A wire constituting the induction coil may be formed of a conductor 611 and an insulator 612. Specifically, the insulator 612 may be formed coaxially with the conductor 611 on the outside of the conductor 611. The wire including the conductor 611 and the insulator 612 does not include a bonding member, and thus, production cost may be reduced.

However, if the wires are not fixed by the bonding element 613, a shape of an induction coil may be deformed by some wires being out of position due to an external force and so on. To prevent this, the induction coil may be wound in a shape that may be coupled to an outer surface 621 of an accommodation portion, and then the outside of the induction coil may be wrapped with a bonding element 613. Accordingly, the shape of the induction coil may be fixed.

In addition, a material forming the bonding element may be polyimide. The polyimide has excellent heat resistance, thereby preventing the bonding element 613 from melting due to heat generated by a susceptor. In addition, the polyimide may have little change in characteristics over a wide temperature range and may have excellent electrical characteristics.

For example, when a current flows through the induction coil wrapped by the bonding element 613, the bonding element 613 may be heated by Joule's heat. However, since the polyimide has excellent heat resistance, a risk of the phase change of the bonding element may be reduced.

The bonding element may be an adhesive film formed of polyimide. An outer portion, an upper portion, an inner portion, and a lower portion of the induction coil may be wrapped by the film without gaps, such that the shape of the induction coil may be fixed.

In addition, the polyimide is known to be odorless when vaporized, and thus, it is possible to improve taste of an aerosol generated by the aerosol generating device to which the induction coil fixed by the bonding element 613 is applied.

In addition, a wire constituting the induction coil may include a litz wire made by splicing thin wires including the conductor 611 and the insulator 612 surrounding the conductor 611.

Figure 7:
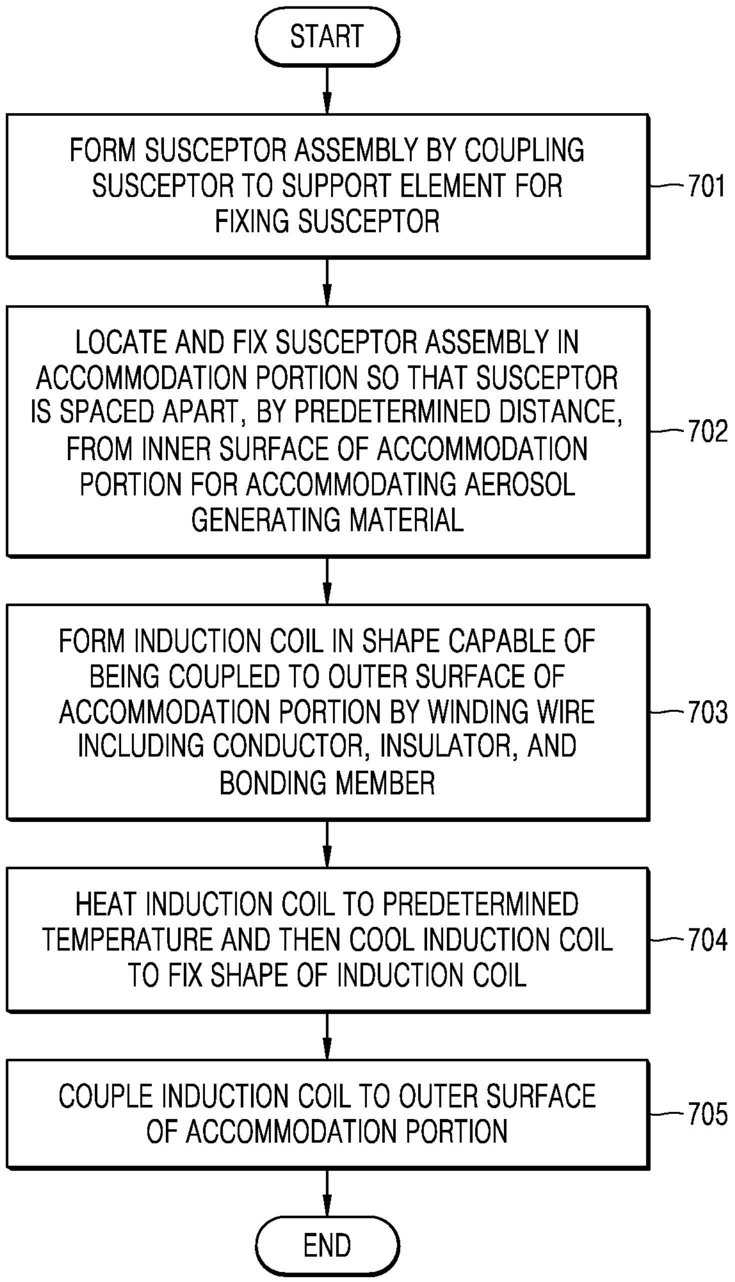
FIG. 7 is a flowchart of a method of manufacturing a heater assembly, according to an embodiment.

FIG. 7 is a flowchart of a method of manufacturing a heater assembly according to an embodiment.

FIG. 7 shows a flowchart of a method of manufacturing a heater assembly for heating an aerosol generating material.

Referring to step 701, a susceptor and a support element may be coupled to each other to form a susceptor assembly. As described above, the susceptor may be a hollow tubular susceptor or a needle-type susceptor. In addition, the support element may be a cap-shaped support element or a pedestal-type support element.

For example, the susceptor assembly including the hollow tubular susceptor may be formed by coupling a first cap to one end of the hollow tubular susceptor and by coupling a second cap to the other end of the hollow tubular susceptor.

As another example, the susceptor assembly including the needle-type susceptor may be formed by coupling a pedestal-type support element to a support portion of the needle-type susceptor.

Referring to step 702, the susceptor assembly may be located and fixed in the accommodation portion so that the susceptor is spaced apart from an inner surface of the accommodation portion by a predetermined distance. That is, the susceptor may be located in the accommodation portion but may not be in direct contact with an inner side of the accommodation portion due to the support element.

As described above with reference to FIG. 3A, the center of the susceptor assembly may coincide with the center of the accommodation portion. In addition, a fixing element may be inserted into a gap between the support element of the susceptor assembly and the accommodation portion, and thus, the susceptor assembly and the accommodation portion may be more firmly coupled to each other.

Referring to step 703, an induction coil may be formed in a shape capable of being coupled to an outer surface of the accommodation portion (i.e., shape corresponding to the outer surface of the accommodation portion) by winding a wire including a conductor, an insulator, and a bonding member.

As described above, the induction coil may be formed by directly winding the wire to the accommodation portion but may be formed by winding a wire around a bobbin to improve assembly properties and productivity.

The bobbin may indicate a column around which a wire is wound to form an induction coil suitable for a predesigned shape and dimensions. After a shape of the induction coil is determined, a bobbin corresponding to the shape may be produced, and the induction coil may be mass-produced by winding the wire around the bobbin and separating the induction coil.

The mass-produced induction coils may be inserted into and coupled to the accommodation portion, and thus, assembly properties and productivity of the heater assembly may be improved.

In addition, according to a method of making a coil by winding a wire around a bobbin, it is not necessary to directly wind the coil around the accommodation portion including the susceptor assembly. Thus, movement of the susceptor assembly in a production process of the heater assembly may be minimized, and thus, it is possible to reduce a possibility of displacement of each of internal components.

That is, according to a method of winding the wire around the bobbin, a possibility of producing a defective heater assembly may be reduced, when compared with a method of directly winding the wire around the accommodation portion.

Referring to step 704, a shape of the induction coil may be fixed by heating the induction coil up to a predetermined temperature and then by cooling the induction coil. The predetermined temperature may be less than or equal to a heat resistance temperature of the conductor and the insulator and may be greater than or equal to a heat resistance temperature of the bonding member.

Specifically, by melting only the bonding member without damaging the conductor and the insulator, a gap between adjacent wires constituting the induction coil may be minimized That is, when the molten induction coil is cooled, the bonding member may be bonded between adjacent wires while solidifying, and thus, a shape of the induction coil may be fixed.

Referring to step 705, the induction coil having a fixed shape may be coupled to an outer surface of the accommodation portion. The induction coil is wound in a shape that may be coupled to the accommodation portion (i.e., a shape corresponding to the outer surface of the accommodation portion), and the shape is fixed by step 704 (i.e., by heating and cooling of the induction coil). Thus, the induction coil may be coupled to the accommodation portion by fitting the induction coil around the accommodation portion. Accordingly, the heater assembly according to the embodiment may be manufactured.

Figure 8:
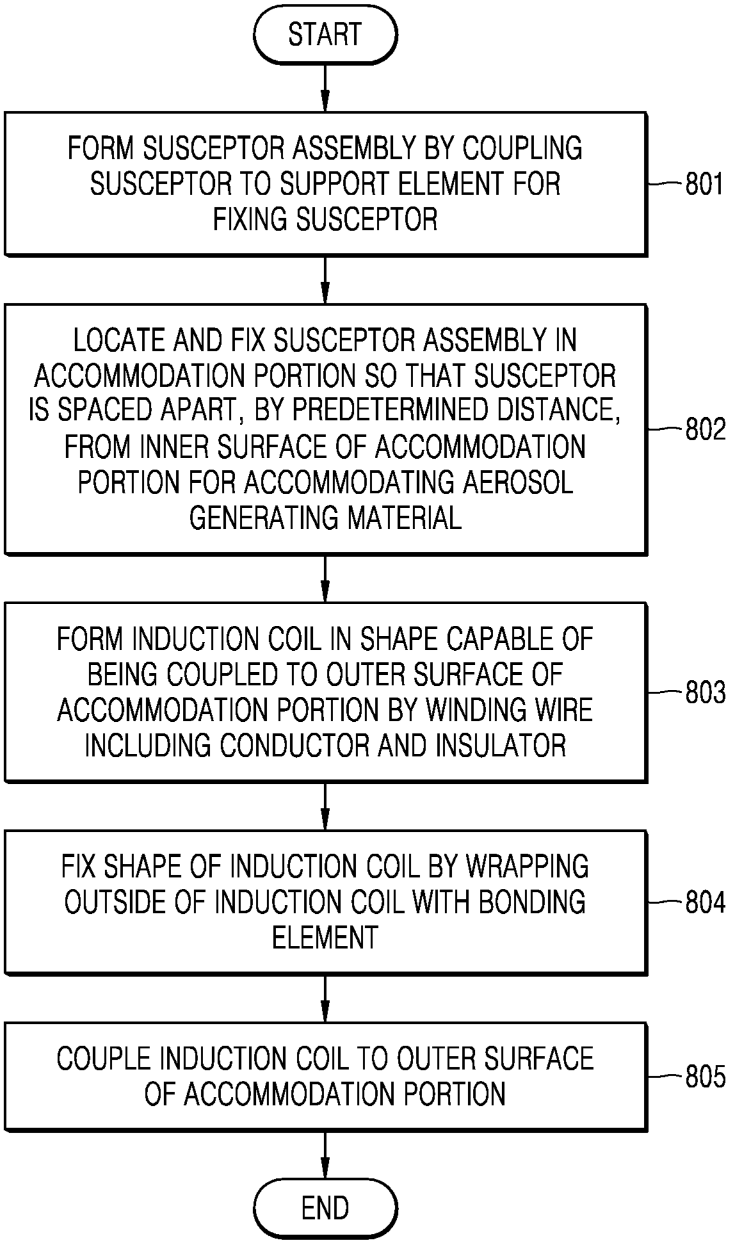
FIG. 8 is a flowchart of a method of manufacturing a heater assembly according to another embodiment.

FIG. 8 is a flowchart of a method of manufacturing a heater assembly according to another embodiment.

Step 801 and step 802 may be the same as step 701 and step 702 of the method of manufacturing the heater assembly shown in FIG. 7.

Referring to step 803, an induction coil may be formed in a shape that may be coupled to an outer surface of an accommodation portion (i.e., shape corresponding to the outer surface of the accommodation portion) by winding a wire including a conductor and an insulator. According to the present embodiment, when compared with the embodiment of FIG. 7, the manufacturing costs may be reduced because the wire does not include the bonding member.

Referring to step 804, a shape of the induction coil may be fixed by wrapping the outside of the induction coil with a bonding element. The bonding element may include an adhesive material, and may be made in the form of an adhesive tape or an adhesive film. By winding a surface of the induction coil with the bonding element, the wire may be fixed such that the wire may not be displaced from the set positions. For example, a material forming the bonding element may be polyimide.

Referring to step 805, the fixed induction coil may be coupled to an outer surface of the accommodation portion. The induction coil in which the wire is fixed may be fitted around the accommodation portion such that the wire surrounds the outer surface of the accommodation portion, and thereby, a heater assembly may be manufactured.

Figure 9:
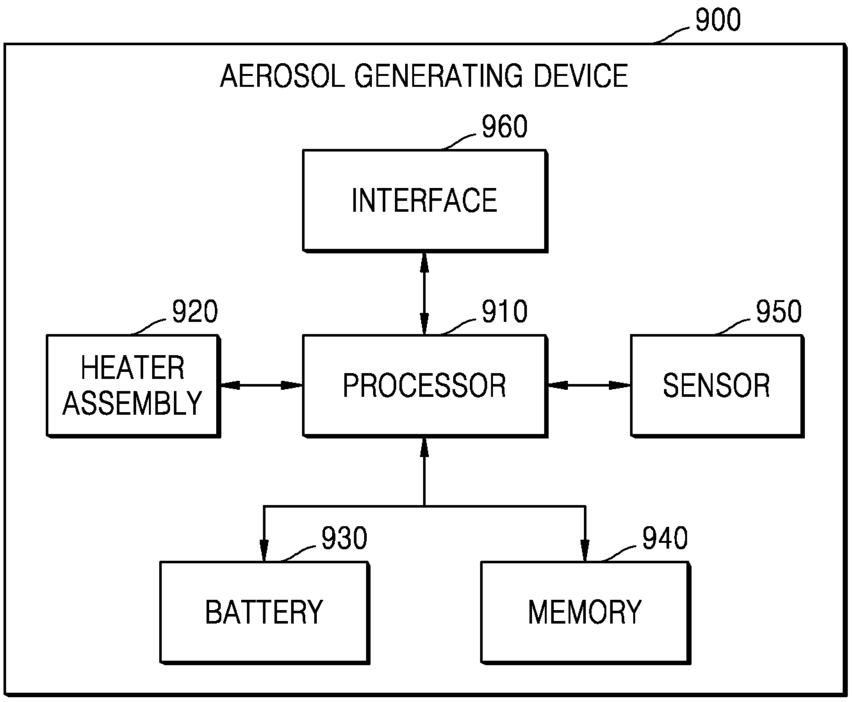
FIG. 9 is a block diagram showing a hardware configuration of an aerosol generating device according to an embodiment.

FIG. 9 is a block diagram showing a hardware configuration of an aerosol generating device according to an embodiment.

Referring to FIG. 9, an aerosol generating device 900 may include a processor 910, a heater assembly 920, a battery 930, a memory 940, a sensor 950, and an interface 960.

The heater assembly 920 is electrically heated by power supplied from the battery 930 under the control of the processor 910. The heater assembly 920 may be located in an accommodation space of the aerosol generating device 900 that accommodates a cigarette.

After a cigarette is inserted through an insertion hole of the aerosol generating device 900 from the outside, the cigarette is placed in the accommodation space. Thereby, one end of the cigarette may be inserted into the heater assembly 920. Therefore, the heated heater assembly 920 may increase a temperature of the aerosol generating material in the cigarette. The heater assembly 920 may be applicable without limitation as long as the heater assembly may accommodate a cigarette.

For stable use of the aerosol generating device 900, power according to regulation of 3.2 V, 2.4 A, and 8 W may be supplied to the heater assembly 920, but the present disclosure is not limited thereto. For example, when power is supplied to the heater assembly 920, a surface temperature of a susceptor may rise to 400° C. or higher. The surface temperature of the susceptor may rise to approximately 350° C. before 15 seconds elapse from when power starts to be supplied to the heater assembly 920.

The aerosol generating device 900 may include a separate temperature sensor. Alternatively, instead of including a separate temperature sensor, the heater assembly 920 may serve as a temperature sensor. Alternatively, while the heater assembly 920 serves as a temperature sensor, a separate temperature sensor may be further provided in the aerosol generating device 900.

The processor 910 controls all operations of the aerosol generating device 900. The processor 910 is an integrated circuit implemented as a processing unit such as a microprocessor and a microcontroller.

The processor 910 analyzes results sensed by the sensor 950 and controls subsequent processing to be performed. The processor 910 may start or stop supply of power from the battery 930 to the heater assembly 920 according to the sensed results.

In addition, the processor 910 may control the amount of power supplied to the heater assembly 920 and a time at which the power is supplied so that the heater assembly 920 is heated to a predetermined temperature or maintains an appropriate temperature. Furthermore, the processor 910 may process various types of input information and output information of the interface 960.

The processor 910 may count the number of smoking by a user using the aerosol generating device 900 and control related functions of the aerosol generating device 900 to limit the user's smoking according to the counting result.

The memory 940, as a hardware component configured to store various pieces of data processed in the aerosol generating device 900, The memory 940 may store data processed or to be processed by the processor 910. The memory 940 may include various types of memories; random access memory (RAM), such as dynamic random access memory (DRAM) and static random access memory (SRAM), etc.; read-only memory (ROM); electrically erasable programmable read-only memory (EEPROM), etc.

The memory 940 may store data about a user's smoking pattern such as smoking time and a smoking frequency. In addition, the memory 940 may store data related to a reference temperature change value when a cigarette is accommodated in an accommodation passage.

The battery 930 supplies power used to operate the aerosol generating device 900. That is, the battery 930 may supply power to heat a susceptor. In addition, the battery 930 may supply power required for operations of other hardware, the processor 910, the sensor 950, and the interface 960 provided in the aerosol generating device 900.

The battery 930 may be a lithium iron phosphate ($LiFePO4$) battery but is not limited thereto and may be manufactured as a lithium cobalt oxide ($LiCoO2$) battery, a lithium titanate battery, or so on. The battery 930 may be a rechargeable battery or a disposable battery.

The sensor 950 may include various types of sensors such as a puff detection sensor (temperature detection sensor, flow detection sensor, position detection sensor, or so on), a cigarette insertion detection sensor, and temperature detection sensor of a susceptor. Results sensed by the sensor 950 are transmitted to the processor 910, and the processor 910 may control the aerosol generating device 900 so that various functions, such as control of a temperature of the heater assembly 920, restriction of smoking, determination whether or not to insert a cigarette, and display of notification according to the sensed results, are performed.

The interface 960 may include various interfacing devices such as a display or lamp that outputs visual information, a motor that outputs tactile information, a speaker that outputs sound information, and terminals for data communication with input/output (I/O) interfacing units (for example, buttons and a touch screen) that receives information input by a user or outputs information to the user or terminals for receiving power, a communication interfacing module for performing wireless communication (for example, Wi-Fi, Wi-Fi direct, Bluetooth, near-field communication (NFC), and so on) with an external device. However, the aerosol generating device 900 may select some of the various interfacing devices exemplified above to perform.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. A heater assembly for heating an aerosol generating material, the heater assembly comprising:

an accommodation portion configured to accommodate the aerosol generating material;

an induction coil coupled to an outer surface of the accommodation portion;

a susceptor located in the accommodation portion and configured to generate heat by an alternating magnetic field generated by a current flowing through the induction coil; and a support element coupled to the susceptor such that the susceptor is spaced apart from an inner surface of the accommodation portion by the support element, wherein the induction coil includes a wire including a conductor, an insulator surrounding the conductor, and a bonding member surrounding the insulator.

2. The heater assembly of claim 1, wherein the induction coil has a shape corresponding to the outer surface of the accommodation portion, the induction coil is fixed in the shape when the bonding member is heated to a predetermined temperature and then cooled, and the predetermined temperature does not exceed heat resistance temperatures of the conductor and the insulator, and is greater than or equal to a heat resistance temperature of the bonding member.

3. The heater assembly of claim 1, further comprising a fixing element arranged in a gap between the support element and the accommodation portion such that the support element is fixed to the accommodation portion.

4. The heater assembly of claim 1, wherein the susceptor has a hollow tubular shape having a susceptor opening, and the support element has a cap shape having a support element opening, a diameter of the support element opening is greater than a diameter of the susceptor opening, and the support element is coupled to the susceptor such that a center of the support element opening coincides with a center of the susceptor opening.

5. The heater assembly of claim 4, wherein the support element includes a first cap and a second cap, and the first cap covers at least part of an upper surface of the susceptor and at least part of an outer surface of the susceptor, and the second cap covers at least part of a lower surface of the susceptor and at least part of the outer surface of the susceptor.

6. The heater assembly of claim 1, wherein the bonding member includes at least one of polyamide and polyvinyl butyral.

7. The heater assembly of claim 1, wherein the support element includes a high heat-resisting material and configured to block heat transfer from the susceptor to the accommodation portion.

8. The heater assembly of claim 1, wherein the induction coil includes a litz wire made by splicing wires, each of the wires including the conductor, the insulator surrounding the conductor, and the bonding member surrounding the insulator.

9. A heater assembly for heating an aerosol generating material, the heater assembly comprising:

an accommodation portion configured to accommodate the aerosol generating material;

an induction coil coupled to an outer surface of the accommodation portion;

a susceptor located in the accommodation portion and configured to generate heat by an alternating magnetic field generated by a current flowing through the induction coil; and a support element arranged between the susceptor and the accommodation portion such that the susceptor is separated from an inner surface of the accommodation portion by a predetermined distance, wherein the induction coil includes a wire including a conductor and an insulator surrounding the conductor, and the induction coil is wrapped by a bonding element.

10. The heater assembly of claim 9, wherein the induction coil has a shape corresponding to the outer surface of the accommodation portion, and the induction coil maintains the shape by the bonding element.

11. The heater assembly of claim 9, further comprising a fixing element arranged in a gap between the support element and the accommodation portion such that the support element is fixed to the accommodation portion.

12. The heater assembly of claim 9, wherein the susceptor has a hollow tubular shape having a susceptor opening, and the support element has a cap shape having a support element opening, a diameter of the support element opening is greater than a diameter of the susceptor opening, and the support element is coupled to the susceptor such that a center of the support element opening coincides with a center of the susceptor opening.

13. The heater assembly of claim 10, wherein the bonding element includes polyimide.

14. A method of manufacturing a heater assembly for heating an aerosol generating material, the method comprising:

forming a susceptor assembly by coupling a susceptor to a support element for supporting the susceptor;

locating the susceptor assembly in the accommodation portion for accommodating the aerosol generating material such that the susceptor is spaced apart by a predetermined distance from an inner surface of the accommodation portion by the support element;

forming an induction coil in a shape corresponding to an outer surface of the accommodation portion by winding a wire including a conductor, an insulator, and a bonding member;

heating the induction coil to a predetermined temperature such that the bonding member melts;

cooling the induction coil such that the molten bonding member solidifies and the shape of the induction coil is fixed by the solidified bonding member; and fitting the induction coil around the outer surface of the accommodation portion.

15. A method of manufacturing a heater assembly for heating an aerosol generating material, the method comprising:

forming a susceptor assembly by coupling a susceptor to a support element;

locating the susceptor assembly in the accommodation portion for accommodating the aerosol generating material such that the susceptor is spaced apart from an inner surface of the accommodation portion by the support element;

forming an induction coil in a shape corresponding to an outer surface of the accommodation portion by winding a wire including a conductor and an insulator;

wrapping the induction coil with a bonding element such that a shape of the induction coil is fixed by the bonding element; and fitting the induction coil around the outer surface of the accommodation portion.

* * * * *